United States Patent
Itagaki et al.

(10) Patent No.: US 8,454,767 B2
(45) Date of Patent: Jun. 4, 2013

(54) HEAT TREATMENT METHOD, OUTER JOINT MEMBER, AND TRIPOD TYPE CONSTANT VELOCITY UNIVERSAL JOINT

(75) Inventors: Taku Itagaki, Iwata (JP); Seiya Kato, Iwata (JP); Brian Drier, Columbus, IN (US)

(73) Assignees: NTN Corporation, Osaka (JP); NTN Driveshaft, Inc., Columbus, IN (US)

( * ) Notice: Subject to any disclaimer, the term of this patent is extended or adjusted under 35 U.S.C. 154(b) by 0 days.

(21) Appl. No.: 13/037,458

(22) Filed: Mar. 1, 2011

(65) Prior Publication Data

US 2012/0222779 A1    Sep. 6, 2012

(51) Int. Cl.
   *C21D 1/10*    (2006.01)
   *F16D 3/205*   (2006.01)

(52) U.S. Cl.
   USPC .................. 148/571; 464/905; 29/DIG. 13

(58) Field of Classification Search
   USPC .......... 464/111, 120–123, 132, 905; 266/249; 219/602, 635, 637, 639, 643; 148/570–572; 29/DIG. 13
   See application file for complete search history.

(56) References Cited

U.S. PATENT DOCUMENTS

| | | | | |
|---|---|---|---|---|
| 4,401,485 A | * | 8/1983 | Novorsky | 148/571 |
| 7,160,193 B2 | * | 1/2007 | Itagaki et al. | 464/111 |
| 7,354,347 B2 | * | 4/2008 | Sugiyama et al. | 464/111 |
| 2009/0137325 A1 | * | 5/2009 | Ando et al. | 464/111 |

FOREIGN PATENT DOCUMENTS

| | | | |
|---|---|---|---|
| DE | 19915264 | * | 6/2000 |
| JP | 56069325 | * | 6/1981 |
| JP | 61-34481 | | 9/1984 |
| JP | 59208023 | * | 11/1984 |
| JP | 3-26335 | | 8/1985 |
| JP | 10324910 | * | 12/1998 |
| JP | 10324914 | * | 12/1998 |
| JP | 2002080914 | * | 3/2002 |
| JP | 2003089822 | * | 3/2003 |

* cited by examiner

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A heat treatment method is capable of molding, by mobile quenching of induction quenching, an outer joint member of a tripod type constant velocity universal joint having excellent strength without forming hardened layers in larger radially-inner portions. Mobile quenching is performed in such a manner that a high-frequency induction heating coil is moved in an axial direction relative to an outer joint member, and thus hardened layers are formed on the roller guide surfaces. Magnetic field line cut-out bodies for cutting out generated magnetic field lines are arranged on the high-frequency induction heating coil. The larger radially-inner portions become an unquenched portion by cutting out the magnetic field lines with the magnetic field line cut-out bodies.

9 Claims, 12 Drawing Sheets

HEAT TREATMENT METHOD, OUTER JOINT MEMBER, AND TRIPOD TYPE CONSTANT VELOCITY UNIVERSAL JOINT

TECHNICAL FIELD

The present invention relates to a heat treatment method, an outer joint member, and a tripod type constant velocity universal joint.

BACKGROUND ART

As a constant velocity universal joint used in a power transmission device of an automobile, various industrial machines, or the like, there is a tripod type constant velocity universal joint using a tripod member as an inner joint member. The tripod type constant velocity universal joint includes, for example, as illustrated in FIG. 15, an outer joint member 1, a tripod member 2 serving as the inner joint member, and torque transmission members (roller members) 3.

The outer joint member 1 includes a cup-like mouth portion 4 opened at one end thereof. In an inner peripheral surface of the mouth portion 4, there are formed three track grooves 6 extending in an axial direction of the outer joint member. In side walls facing to each other in a circumferential direction of each of track grooves 6, there are formed roller guide surfaces (roller sliding surfaces) 7a, 7a.

The tripod member 2 includes a boss 8 and leg shafts 9. The boss 8 is provided with spline hole or serration hole 11 which is coupled to a shaft (not shown) to be allowed to transmit torque. The leg shafts 9 each protrude in a radial direction from positions trisecting the boss 8 in the circumferential direction.

Further, each of the torque transmission members 3 includes: a roller 12 including a ring-like body including a radially-outer surface 13 formed into a convex spherical surface; and a ring 15 fitted into the roller 12 through intermediation of a plurality of rollers 16. That is, the roller 12 and the ring 15 are unitized through intermediation of the plurality of rollers 16. Those members and the like constitute a roller assembly. In this case, the roller 12 can be called an outer roller, and the ring 15 can be called an inner roller.

By the way, the outer joint member 1 includes: the mouth portion 4 including the track grooves 6; and a stem portion (not shown) provided to protrude from a bottom wall of the mouth portion 4. Further, a radially-inner surface of the mouth portion 4 exhibits a shape of a three-petal corolla of a flower, in which smaller radially-inner portions 7b and larger radially-inner portions 7c are alternately connected together through intermediation of the roller guide surfaces 7a in the circumferential direction. That is, in the outer joint member 1, the roller guide surfaces 7a facing to each other in the circumferential direction and the track grooves 6 including the larger radially-inner portions 7c each provided between both of the roller guide surfaces 7a, 7a are formed at three positions in an inner periphery of the outer joint member.

The tripod type constant velocity universal joint illustrated in FIG. 15 uses so-called double-roller type roller members each including the inner roller and the outer roller. However, as illustrated in FIG. 16 and FIG. 17, the tripod type constant velocity universal joint may use so-called single-roller type roller members each including a roller fitted onto a cylindrical outer peripheral surface of the leg shaft through a plurality of needle rollers in such a manner that the roller is rotatable. In this case, each of the leg shafts 9 includes a cylindrical outer peripheral surface 74, and an annular ring groove 76 formed in vicinity of an end of each of the leg shafts. A roller 80 is fitted onto an outer periphery of each of the leg shaft 9 through a plurality of needle rollers 82 in such a manner that the roller 80 is rotatable. The cylindrical outer peripheral surface 74 of each of the leg shafts 9 provides an inner raceway surface for the plurality of needle rollers 82. The roller 80 includes a cylindrical inner peripheral surface to provide an outer raceway surface for the plurality of needle rollers 82.

The plurality of needle rollers 82 are held in contact with an outer washer 84 on outer end surfaces of the plurality of needle rollers, and with an inner washer 88 on end surfaces opposite to the outer end surfaces of the plurality of needle rollers, when viewed from a radial direction of the leg shaft 9. The outer washer 84 is regulated from moving in the axial direction by a circlip 86 mounted into the ring groove 76. As a result, the plurality of needle rollers 82 are also regulated from moving in the axial direction.

Generally, the roller guide surfaces 7a of the outer joint member 1 are subjected to heat hardening treatment. As the heat hardening treatment, there is induction quenching. The induction quenching is mainly divided into a one-shot quenching method of performing heat treatment at a fixed position (Patent Literature 1), and a mobile quenching method in which the coil is moved relative to the outer joint member (Patent Literature 2).

In the one-shot quenching, there is used, as illustrated in FIG. 10 and FIG. 11, a high-frequency heating apparatus including a high-frequency induction heating coil 17. In this case, the high-frequency induction heating coil 17 includes heating portions 17a, 17a, 17a respectively fitted into the three track grooves 6 of the outer joint member 1. Therefore, it is possible to both heat and rapidly cool the roller guide surfaces 7a over an axial entire region of the joint at one time. Further, in Patent Literature 1 described above, in order to prevent hardened layers from being formed in inner surfaces of the larger radially-inner portions 7c, non-conductive ferrite cores are fitted in an induction coil. Therefore, by using the above-mentioned high-frequency induction heating apparatus, there are formed hardened layers S only in surface layers of the roller guide surfaces 7a as illustrated in FIG. 11.

Further, in the mobile quenching method, another high-frequency induction heating apparatus illustrated in FIG. 12 to FIG. 14 is used. The high-frequency induction heating apparatus includes: a coil 18 wound to have a three-leaf clover shape; and a cooling jacket 19 attached to the coil 18. The coil 18 includes heating portions 18a, 18a, 18a each having substantially triangle shape and being provided at about 120° pitches in a circumferential direction of the coil. Each of the heating portions 18a includes: curved portions 20a, 20a respectively opposed to the roller guide surfaces 7a; and a straight portion 20b opposed to the larger radially-inner portion 7c. Note that, the cooling jacket 19 has a three-leaf clover shape similarly to the coil 18.

In the mobile quenching method, the coil 18 and the cooling jacket 19 are moved along an axial direction in the mouth portion 4 of the outer joint member 1. Along with the above-mentioned movement, heated surfaces (roller guide surfaces 7a and larger radially-inner portions 7c) are heated. Following the above-mentioned heating, the heated surfaces are rapidly cooled with cooling water injected through the cooling jacket 19. Thus, the roller guide surfaces 7a and the larger radially-inner portions 7c are subjected to the heat hardening treatment. In this manner, the hardened layers S are formed.

Citation List

Patent Literature

[PTL 1] Japanese Examined Patent Publication No. Sho 61-34481 [PTL 2] Japanese Examined Utility Model Publication No. Hei 03-26335

SUMMARY OF INVENTION

Technical Problems

In the general one-shot quenching, temporal heating and temporal cooling are conducted, and hence there is a demerit in that distortion is easy to occur in a thin-walled portion and the like. In contrast, the mobile quenching has effects of stabilizing occurring distortion, uniforming a thickness of the quenched and hardened layer, and the like.

By the way, taking a function of the joint in consideration, there is no problem as long as the hardened layers are provided at least in the roller guide surfaces 7a. However, if the mobile quenching is performed, the roller guide surfaces 7a and the larger radially-inner portions 7c are subjected to the heat hardening treatment, and hence the hardened layers S are formed as illustrated in FIG. 14.

In an outer periphery of the outer joint member 1, a boot band fastening groove 5 is formed, and a portion in which the boot band fastening groove 5 is provided is thin. Therefore, the hardened layers S in the thin-walled portion may give way to a side of the outer periphery. Thus, the above-mentioned portion may be weaken in terms of a strength thereof. Therefore, there is a demerit in that a degree of freedom for designing is limited, for example a downsizing of the joint becomes difficult.

Therefore, the present invention has been made in view of the above-mentioned circumstances, and it is an object of the present invention to provide a heat treatment method capable of molding, by mobile quenching of induction quenching, an outer joint member of a tripod type constant velocity universal joint excellent in a strength thereof without forming hardened layers in larger radially-inner portions, and to provide the outer joint member and the tripod type constant velocity universal joint which are manufactured by the above-mentioned heat treatment method.

Solution to Problems

According to a first aspect of the present invention, there is provided a heat treatment method for forming hardened layers in roller guide surfaces of an outer joint member, including: performing mobile quenching in such a manner that a high-frequency induction heating coil is moved in an axial direction relative to the outer joint member including track grooves which are formed at three positions of an inner periphery of the outer joint member, and each of which includes: the roller guide surfaces facing to each other in a circumferential direction of the outer joint member; and a larger radially-inner portion provided between both of the roller guide surfaces; providing heating-suppressing portions for the larger radially-inner portions in positions of the high-frequency induction heating coil, the positions being respectively opposed to the larger radially-inner portions; and setting a range (i.e., section) corresponding to a boot mounting portion in at least a center portion in the circumferential direction in each of the larger radially-inner portions of the outer joint member to be an unquenched portion by cutting out the magnetic field lines with the magnetic field line cut-out bodies.

According to the first aspect of the present invention, in the heat treatment method, it is possible to form the hardened layers in the roller guide surfaces by the mobile quenching of induction quenching without forming the hardened layer in the range (i.e., section) corresponding to the boot mounting portion in at least the center portion in the circumferential direction in each of the larger radially-inner portions of the outer joint member.

The heating-suppressing portions for the larger radially-inner portions include magnetic field line cut-out bodies for cutting out magnetic field lines generated through the high-frequency induction heating coil. The magnetic field line cut-out bodies include, for example, ferromagnetic cores fitted into portions of the high-frequency induction heating coil, at which the ferromagnetic cores come close to the larger radially-inner portions, respectively. Further, each of the ferromagnetic cores includes, for example, a silicon steel.

According to a second aspect of the present invention, there is provided a heat treatment method for forming hardened layers in roller guide surfaces of an outer joint member, including: performing mobile quenching in such a manner that a high-frequency induction heating coil is moved in an axial direction relative to the outer joint member including track grooves which are formed at three positions of an inner periphery of the outer joint member, and each of which includes: the roller guide surfaces facing to each other in a circumferential direction of the outer joint member; and a larger radially-inner portion provided between both of the roller guide surfaces; and setting a range (i.e., section) corresponding to a boot mounting portion in at least a center portion in the circumferential direction in each of the larger radially-inner portions of the outer joint member to be an unquenched portion by the high-frequency induction heating coil including retracted portions to be prevented from coming close to the larger radially-inner portions.

According to the second aspect of the present invention, in the heat treatment method, the high-frequency induction heating coil includes the retracted positions to be prevented from coming close to the larger radially-inner portions. Therefore, the range (i.e., section) corresponding to the boot mounting portion in at least the center portion in the circumferential direction in each of the larger radially-inner portions is prevented from being heated by the heat treatment, and the range (i.e., section) becomes the unquenched portion.

According to a third aspect of the present invention, there is provided a heat treatment method for forming hardened layers in roller guide surfaces of an outer joint member, including: performing mobile quenching in such a manner that a high-frequency induction heating coil is moved in an axial direction relative to the outer joint member including track grooves which are formed at three positions of an inner periphery of the outer joint member, and each of which includes: the roller guide surfaces facing to each other in a circumferential direction of the outer joint member; and a larger radially-inner portion provided between both of the roller guide surfaces; providing, on an outer diameter side of the roller guide surfaces of the outer joint member, flange portions opposed to a roller member; and setting at least a range (i.e., section) corresponding to a boot mounting portion in each of the larger radially-inner portions to be an unquenched portion serving as an unheated portion.

According to the third aspect of the present invention, in the heat treatment method, on an outer diameter side of the roller guide surfaces of the outer joint member, the flange portions opposed to the roller member are provided. Therefore, at least the range (i.e., section) corresponding to the boot mounting portion in each of the larger radially-inner portions is prevented from being heated by the heat treatment, and the range (i.e., section) becomes the unquenched portion.

Each of the heat treatment methods may include: forming a smaller radially-inner portion between the larger radially-inner portions of the outer joint member; and forming a hardened layer in the smaller radially-inner portion by the mobile quenching. Further, each of the heat treatment methods may further include setting an entire of each of the larger radially-inner portions of the outer joint member to be an unquenched portion.

On a joint deep side of the larger radially-inner portions of the outer joint member, a boot mounting groove or the like is prevented from being formed in the radially-outer surface of the outer joint member. Therefore, it is possible to prevent unquenched portions from being formed on a joint deep side of the larger radially-inner portions of the outer joint member. Further, hardened layers may be formed only in the roller guide surfaces on an inner diameter side of the outer joint member.

According to the present invention, a tripod type constant velocity universal joint includes: the outer joint member treated by the heat treatment method; a tripod member including three leg shafts arranged in the outer joint member and protruded in a radial direction; and a roller member mounted to each of the three leg shafts of the tripod member and guided in an axial direction of the outer joint member along the roller guide surfaces.

The roller member is fitted into a spherical outer peripheral surface of each of the three leg shafts to be capable of oscillating, and is guided in the axial direction of the outer joint member along the roller guide surfaces.

The roller member may include: a roller inserted in each of track grooves of the outer joint member; and a ring fitted onto each of the three leg shafts, for supporting the roller to be rotatable. The roller may be movable in the axial direction of the outer joint member along the roller guide surfaces, and an inner peripheral surface of the ring may be formed to have a circular-arc convex cross-section. In addition, an outer peripheral surface of each of the three leg shafts may be formed to have a straight shape in a longitudinal section of each of the three leg shafts and to be held, in a cross-section of each of the three leg shafts, in contact with the inner peripheral surface of the ring in a direction orthogonal to an axis of the tripod type constant velocity universal joint and form a gap with respect to the inner peripheral surface of the ring in an axial direction of the tripod type constant velocity universal joint.

It is preferred that the cross-section of each of the three leg shafts be set to have a substantially oval shape including a longitudinal axis orthogonal to the axis of the tripod type constant velocity universal joint.

Advantageous Effects of Invention

In the heat treatment method of the present invention, the hardened layers can be formed in the roller guide surfaces without forming the hardened layer in the range (i.e., section) corresponding to the boot mounting portion of at least the center portion in the circumferential direction in each of the larger radially-inner portions of the outer joint member. Therefore, it is possible to ensure a strength of the opening portion of the outer joint member. In addition, the mobile quenching is employed as a quenching method, and hence distortion is difficult to occur, and a thickness of the quenched and hardened layers can be uniformed.

As long as the magnetic field line cut-out bodies include the ferromagnetic cores, it is possible to stably form the unquenched portions. Further, each of the ferromagnetic core may include, for example, a silicon steel. In this case, without using a specific (special) material, it is possible to attach the ferromagnetic cores to the high-frequency induction heating coil at relatively low cost.

The unquenched portions may be formed in the entire larger radially-inner portions of the outer joint member, or the unquenched portions may be prevented from being formed on the joint deep side of the larger radially-inner portions. Otherwise, the hardened layers may be formed only in the roller guide surfaces. Even in this case, without deteriorating a function as the outer joint member, it is possible to form the hardened layers in an optimum range.

The outer joint member of the tripod type constant velocity universal joint of the present invention is treated by the heat treatment method. Therefore, the outer joint member is stable in terms of a strength thereof and is excellent in durability.

The tripod type constant velocity universal joint of the present invention uses the outer joint member treated by the heat treatment method, and hence becomes a high-quality tripod type constant velocity universal joint excellent in the durability. In addition, a degree of freedom for designing, for example, downsizing of the joint increases. Further, the outer joint member is applicable to various types of tripod type constant velocity universal joints.

DETAILED DESCRIPTION OF THE INVENTION

Hereinafter, embodiments of the present invention are described with reference to the drawings.

Figure 1:
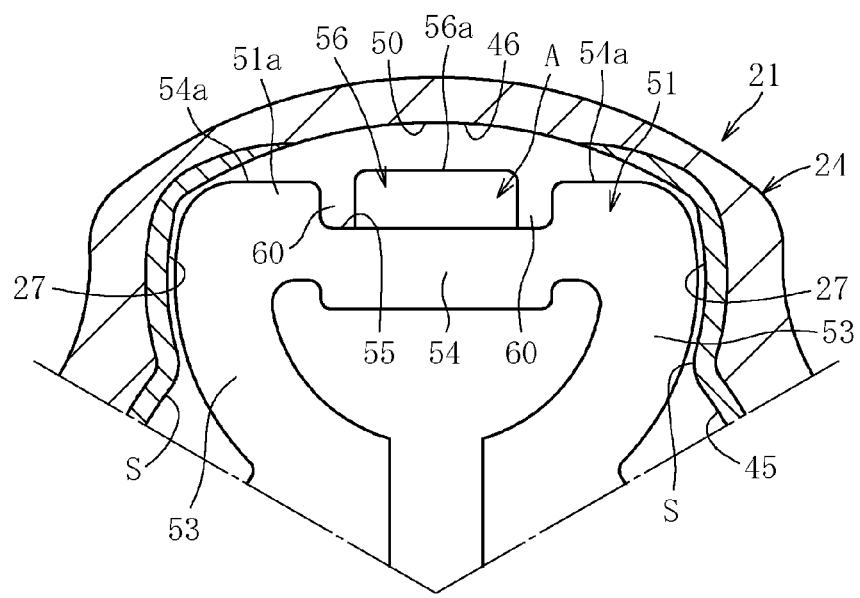
[FIG. 1] A sectional view illustrating an embodiment of the present invention and illustrating a relation between a high-frequency induction heating coil and an outer joint member which are used for a heat treatment method.
Figure 4:
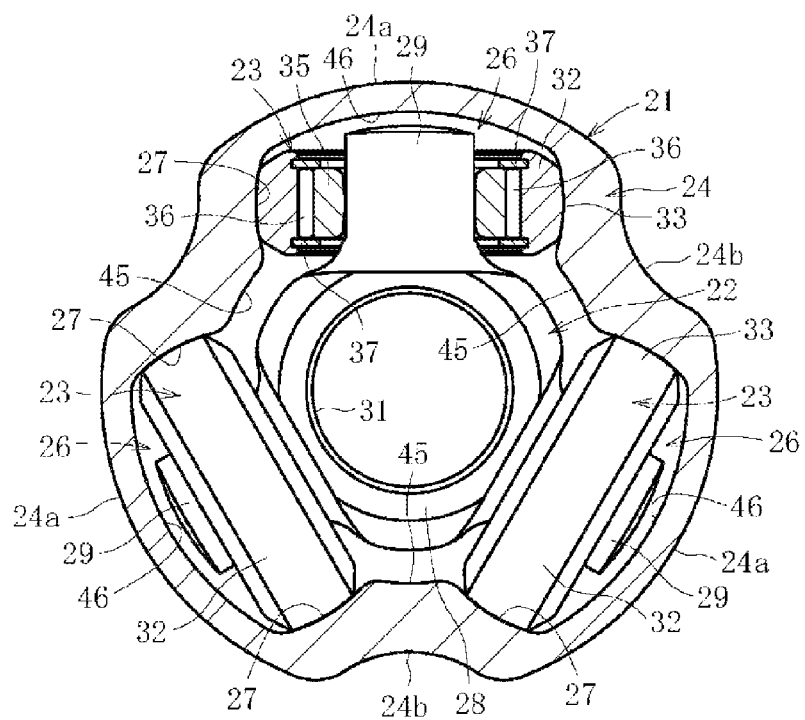
[FIG. 4] A cross-sectional view of a tripod type constant velocity universal joint of the present invention.
Figure 5:
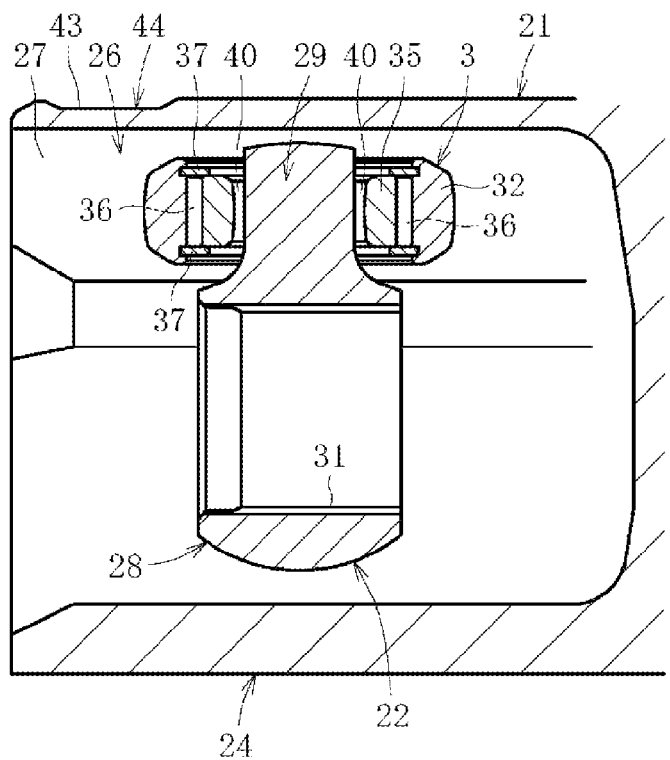
[FIG. 5] A longitudinal sectional view of the tripod type constant velocity universal joint.
Figure 6:
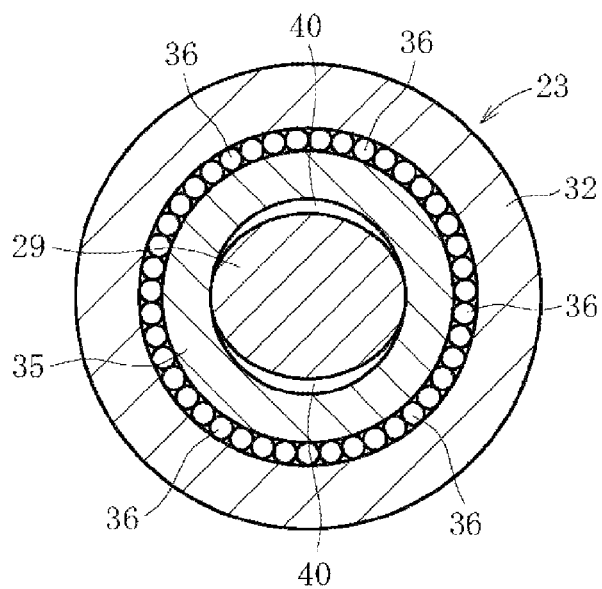
[FIG. 6] A main-part sectional view of the tripod type constant velocity universal joint.

FIG. 1 illustrates a main part sectional view of an outer joint member subjected to heat hardening treatment by a heat treatment method according to the present invention. The outer joint member is used in a tripod type constant velocity universal joint as illustrated in FIG. 4 to FIG. 6. The tripod type constant velocity universal joint includes: an outer joint member 21; a tripod member 22 serving as an inner joint member; and torque transmission members 23.

The outer joint member 21 includes: a cup-like mouth portion 24 opened at one end thereof; and track grooves 26 each extending in an axial direction from positions trisecting an inner periphery thereof in the circumferential direction. The mouth portion 24 has a non-cylindrical shape in which larger-diameter portions 24a and smaller-diameter portions 24b are alternately arranged when viewed in a cross-section. That is, the mouth portion 24 forms the larger-diameter portions 24a and the smaller-diameter portions 24b. Thus, in an inner peripheral surface of the mouth portion, there are formed the three track grooves 26 each extending in the axial direction.

In side walls facing to each other in the circumferential direction of each of track grooves 26, there are formed roller guide surfaces (roller sliding surfaces) 27, 27. Further, a radially-inner surface exhibits a shape of a three-petal corolla of a flower, in which smaller radially-inner portions 45 and larger radially-inner portions 46 are alternately connected together through intermediation of the roller guide surfaces 27 in the circumferential direction. That is, in the outer joint member 21, the roller guide surfaces 27 and track grooves 6 are formed at three positions in an inner periphery of the outer joint member. In this case, the roller guide surfaces 27 face to each other in the circumferential direction, and the track grooves 6 include the larger radially-inner portions 46 each provided between both of the roller guide surfaces 27, 27.

The tripod member 22 includes a boss 28 and leg shafts 29. The boss 28 is provided with a spline hole or a serration hole 31 which is coupled to a shaft (not shown) to be allowed to transmit torque. The leg shafts 29 each protrude in a radial direction from positions trisecting the boss 28 in the circumferential direction.

Further, each of the torque transmission members (roller members) 23 includes: a roller 32 including a ring-like body including a radially-outer surface 33 formed into a convex spherical surface; and a ring 35 fitted into the roller 32 through intermediation of a plurality of rollers 36. That is, the roller 32 and the ring 35 are unitized through intermediation of the plurality of rollers 36. Those members and the like constitute a roller assembly (roller member). In this case, the roller 32 can be called an outer roller, and the ring 35 can be called an inner roller.

That is, the ring (inner roller) 35 is fitted onto an outer peripheral surface of the leg shaft 29. A cylindrical outer peripheral surface of the inner roller 35 is used as an inner raceway surface, and a cylindrical inner peripheral surface of the outer roller 32 is used as an outer raceway surface. Between the inner raceway surface and the outer raceway surface, there are the needle rollers 36 are interposed to be rotatable. The needle rollers 36 are incorporated under a so-called full state, in which a large number of the rollers are provided as much as possible and a retainer is not used. Note that, in circular grooves formed in end-portion inner-peripheral surfaces of the outer roller 32, there are attached washers 37 for detachment of the needle rollers 36.

A radially-inner surface of the ring 35 is formed into a circular-arc convex surface. Further, a radially-outer surface of the leg shaft 29 is set to have a straight shape in a longitudinal section. The radially-outer surface of the leg shaft 29 is set, in a cross-section, as illustrated in FIG. 5 and FIG. 6, to be held in contact with the radially-inner surface of the ring 35 in a direction orthogonal to an axis of the joint and to form gaps 40 with respect to the radially-inner surface of the ring 35 in the axial direction of the joint. That is, the cross-section of the leg shaft 29 is set to have a substantially oval shape including a longitudinal axis orthogonal to the axis of the joint.

By the way, an opening portion of the outer joint member is sealed with a boot (not shown). The boot includes a larger-diameter portion, a smaller-diameter portion, and a bellows portion coupling the larger-diameter portion and the smaller-diameter portion. Further, in a side of the opening portion of the radially-outer portion of the outer joint member 21, there is formed a boot mounting portion 44 including a recess groove 43 as illustrated in FIG. 5. The boot mounting portion 44 is fitted onto the larger-diameter portion of the boot, and the larger-diameter portion is fastened with the boot band. In this manner, the larger-diameter portion of the boot is mounted onto the boot mounting portion 44 of the outer joint member 21. Further, as described above, the shaft is coupled to the tripod member 22. A boot mounting portion including a recess groove is formed also in the shaft. The boot mounting portion of the shaft is fitted onto the smaller-diameter portion of the boot, and the smaller-diameter portion is fastened with the boot band. In this manner, the smaller-diameter portion of the boot is mounted onto the boot mounting portion of the shaft.

By the way, in a radially-inner surface of the mouth portion 24 of the outer joint member 21, there are formed hardened layers S (see FIG. 1). In this case, in each of the larger radially-inner portions 46, there is formed an unquenched portion 50. Note that, in the illustrated example, the unquenched portion 50 is not formed in the entire larger radially-inner portion 46, and the hardened layers S are formed in circumferential ends of the larger radially-inner portion 46.

Figure 2:
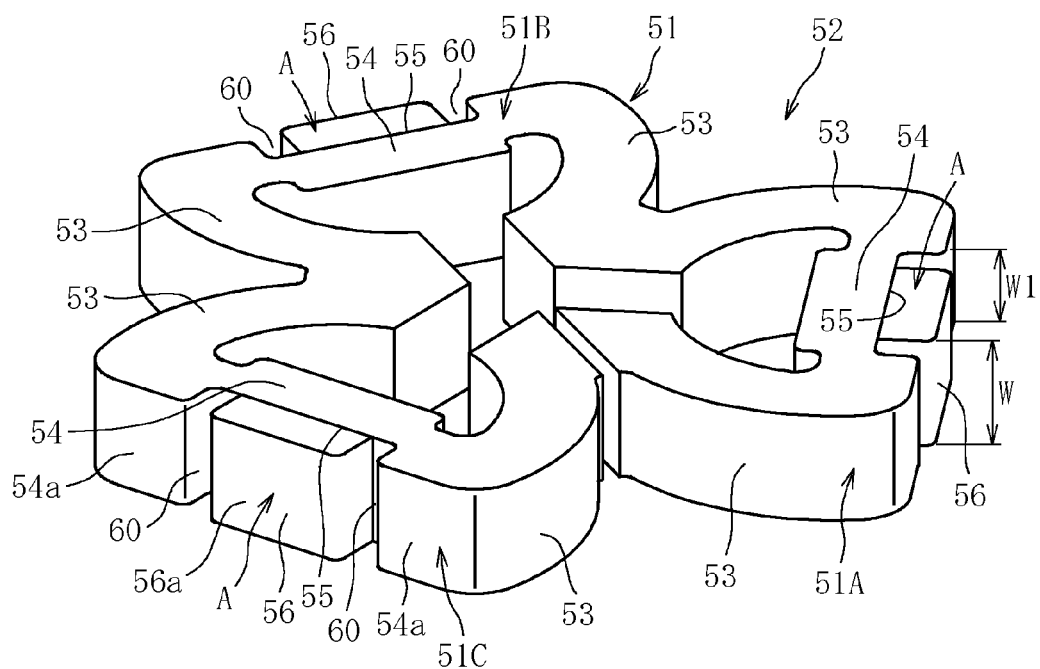
[FIG. 2] A perspective view of the high-frequency induction heating coil.
Figure 3:
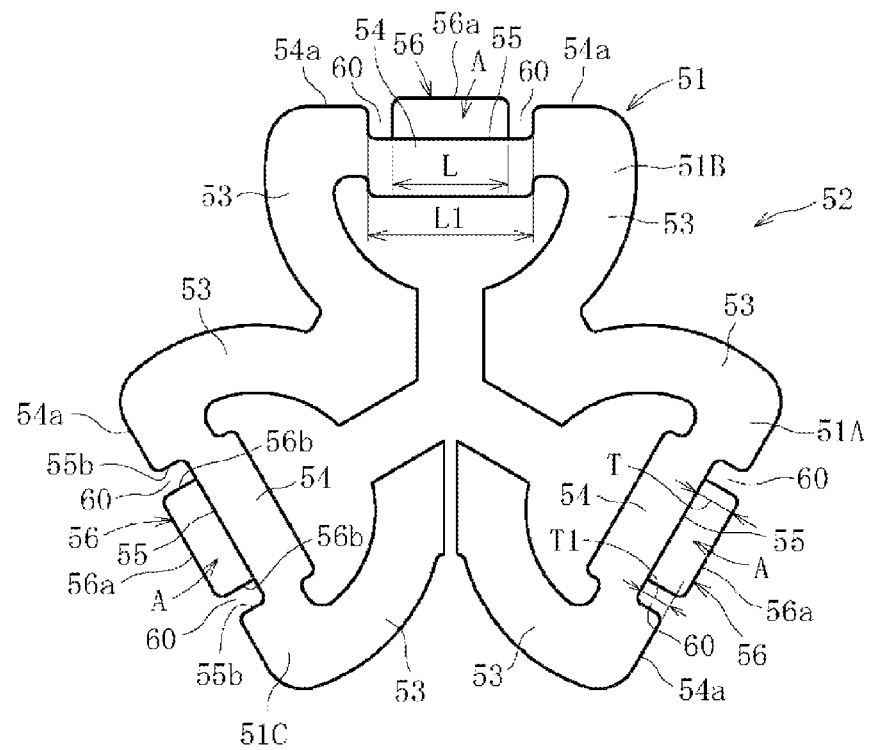
[FIG. 3] A plan view of the high-frequency induction heating coil.

For formation of the hardened layers S, there is used a high-frequency heating apparatus 52 including a high-frequency induction heating coil 51 illustrated in FIG. 2 and FIG. 3. The high-frequency induction heating coil 51 includes three heating portions 51A, 51B, 51C having substantially triangular shapes, which are arranged to have a three-leaf clover shape. Each of the heating portions 51A, 51B, 51C includes: curved portions 53 to face with respect to the roller guide surfaces 27; and straight portions 54 to face to the larger radially-inner portions 46.

Further, heating-suppressing portions for the larger radially-inner portions 46 are provided in positions of the high-frequency induction heating coil 56, the positions being respectively opposed to the larger radially-inner portions 46. Specifically, the heating-suppressing portions include magnetic field line cut-out bodies A. In this case, a recessed portion 55 is provided in a center portion of a surface of each of the straight portions 54, the surface being opposed to each of the larger radially-inner portions. In the recessed portion 55, the magnetic field line cut-out body A including the ferromagnetic core 56 is arranged. A longitudinal length L of the ferromagnetic core 56 is set to be smaller than a longitudinal length L1 of the recessed portion 55. A lateral length W of the ferromagnetic core 56 is set to be substantially the same as a lateral length W1 of the recessed portion 55. Therefore, upper surfaces of the heating portions 51A, 51B, 51C and upper surfaces of the ferromagnetic core 56 are arranged to be flush with each other. Lower surfaces of the heating portions 51A, 51B, 51C and lower surfaces of the ferromagnetic core 56 are arranged to be flush with each other. Further, between side surfaces 55b of the recessed portion 55 and corresponding side surfaces 56b of the ferromagnetic core 56, there are respectively formed gaps 60. Note that, a thickness dimension T of the ferromagnetic core 56 is set to be larger than a depth dimension T1 of the recessed portion 55. An outer surface 56a of the ferromagnetic core 56 protrudes slightly to a side of the larger radially-inner portion with respect to an outer surface (surface opposed to the larger radially-inner portion) 54a of the straight line 54 of the heating portion 51A (51B, 51C).

Figure 12:
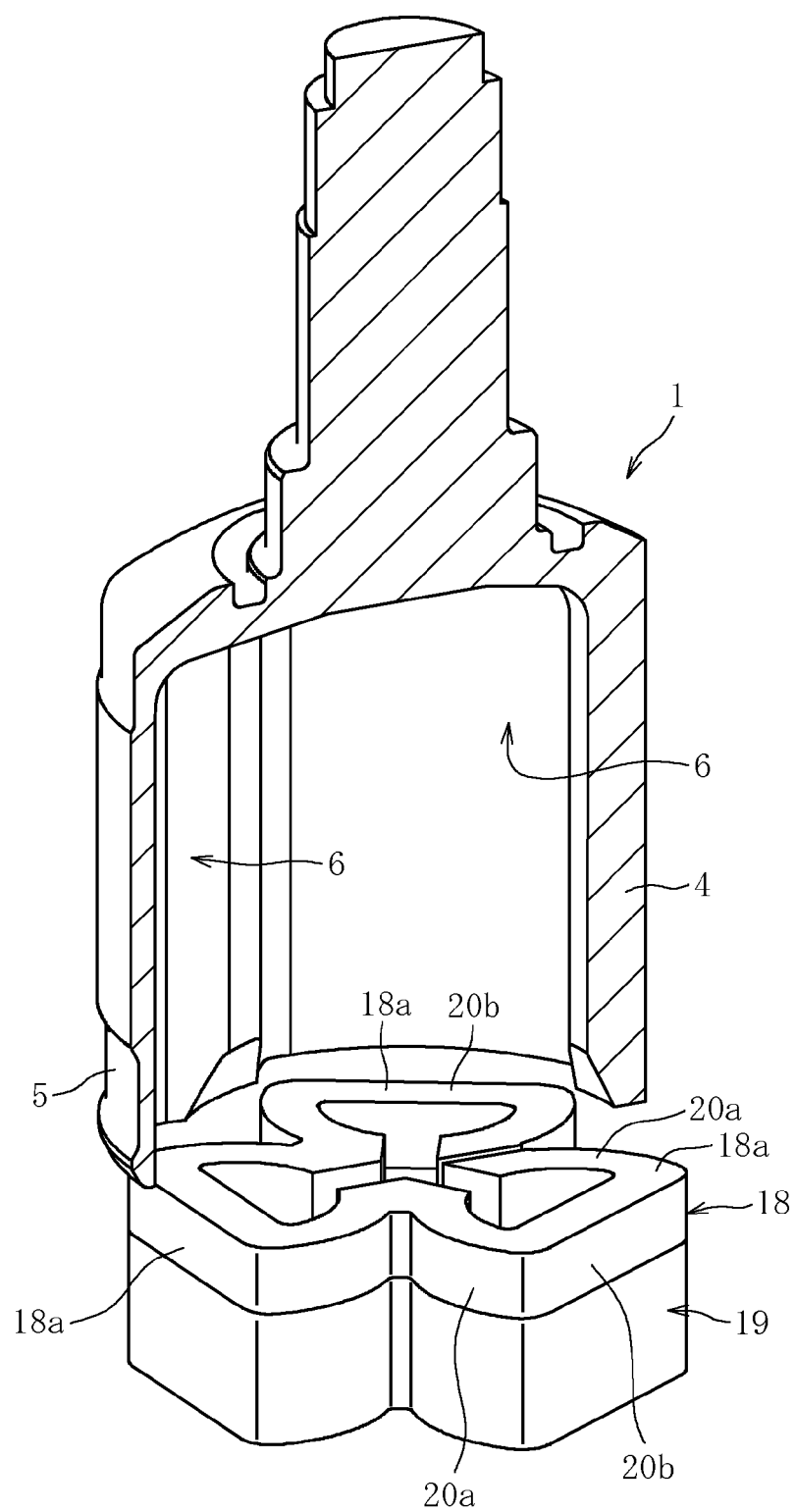
[FIG. 12] A perspective view of a high-frequency induction heating coil and an outer joint member in a heat treatment state by a mobile quenching, which illustrates a conventional example.
Figure 13:
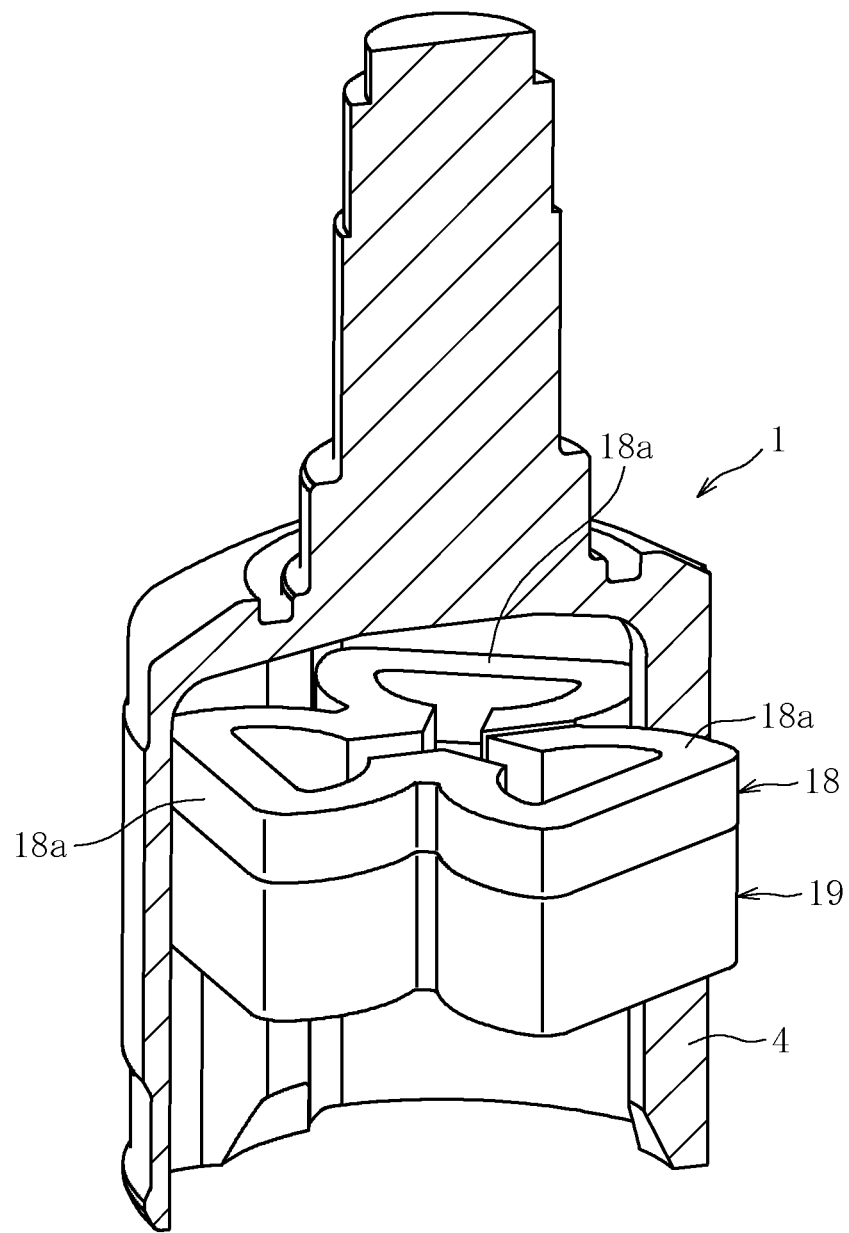
[FIG. 13] A perspective view of the high-frequency induction heating coil and the outer joint member in a heat treatment state by the mobile quenching, which illustrates a conventional example.
Figure 14:
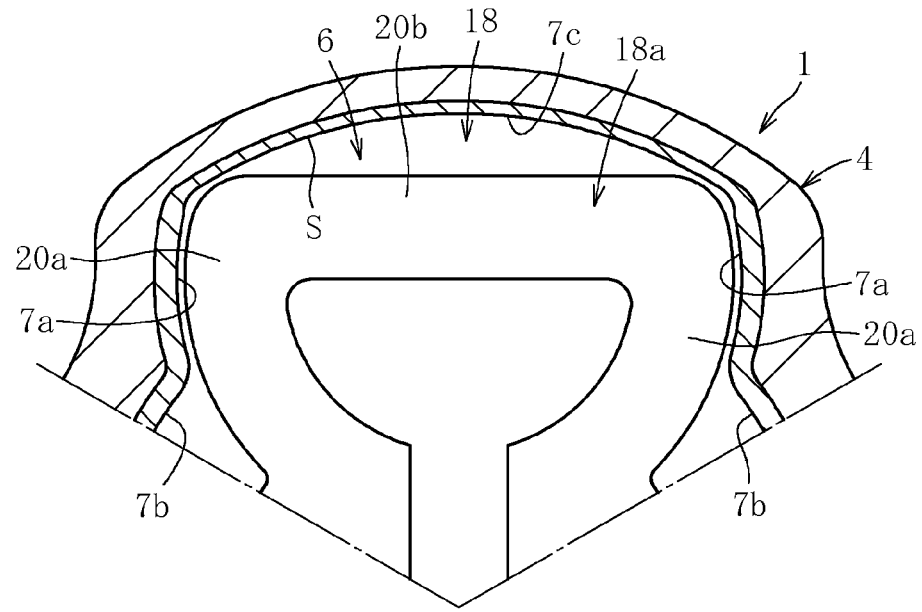
[FIG. 14] A main-part sectional view of the conventional tripod type constant velocity universal joint in the heat treatment state by the mobile quenching.
Figure 15:
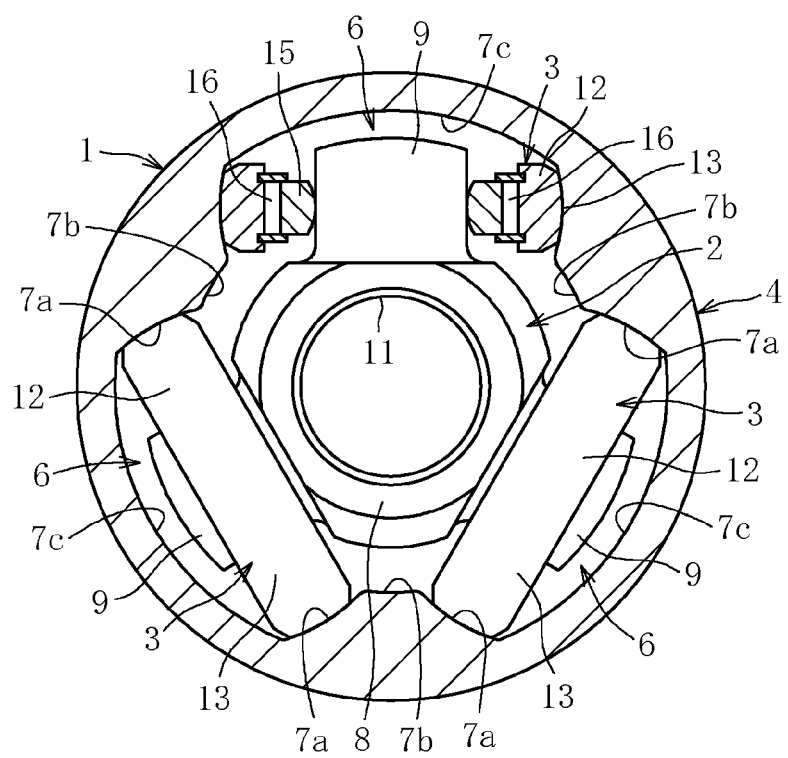
[FIG. 15] A cross-sectional view of the tripod type constant velocity universal joint using the outer joint member molded by a conventional heat treatment method.

Note that, though not illustrated, a cooling jacket as illustrated in FIG. 12 or the like is attached to a lower portion of the high-frequency induction heating coil 51. The cooling jacket includes a cooling piping in which cooling water flows, and has a shape substantially corresponding to a shape of the high-frequency induction heating coil 51.

The high-frequency induction heating coil 51 is supplied with high-frequency current from a high-frequency power source (not shown). In this case, the high-frequency current flows through the heating portion 51A, the heating portion 51B, and the heating portion 51C in this order. As described above, when the high-frequency current flows, an induced electromotive force is generated due to an electromagnetic induction effect. Due to the electromagnetic induction effect, Joule heat is generated. As a result, the roller guide surfaces 27 and the like of the outer joint member 21 can be heated.

Under the above-mentioned state, the high-frequency induction heating coil 51 is continuously moved from a side of an opening portion of the mouth portion to a deep side of the mouth portion. In this manner, the roller guide surfaces 27 and the like are heated from the side of the opening portion to the deep side. Further, along with the above-mentioned movement of the high-frequency induction heating coil 51, the cooling jacket is moved. Thus, a cooling fluid (cooling water) is injected from the cooling jacket to a heated portion of the outer joint member 21, to thereby cool the heated portion. That is, correspondingly to a relative movement of the high-frequency induction heating coil 51, the roller guide surfaces 27 and the like are subsequently heated. Then, following the above-mentioned heating operation, the heated portion is rapidly cooled with the cooling fluid. In this way, induction quenching is performed.

By the way, in each of the heating portions 51A, 51B, 51C of the high-frequency induction heating coil 51, the ferromagnetic core 56 is provided. Therefore, the ferromagnetic core 56 cuts out magnetic field lines generated through the high-frequency induction heating coil 51. That is, the ferromagnetic core is made of a material having high magnetic permeability and is provided to the coil, and hence the ferromagnetic core has an effect of amplifying power through concentrating the magnetic field lines to a work. At the same time, the ferromagnetic core is used for cutting out the magnetic field lines and for preventing undesired heating. Therefore, as in the present invention, if the ferromagnetic core is used for heat hardening treatment for the radially-inner surface of the outer joint member 21 of the tripod type constant velocity universal joint, the unquenched portions 50 can be formed in the larger radially-inner portions 46. That cannot be performed by conventional mobile quenching. Therefore, as illustrated in FIG. 1, in each of the larger radially-inner portions 46 to which the ferromagnetic core 56 faces, the unquenched portion 50 in which the hardened layers S are prevented from being formed is formed.

In the heat treatment method of the present invention, without forming the hardened layers S in the larger radially-inner portions 46 of the outer joint member 21, the hardened layers S can be formed in the roller guide surfaces 27. Therefore, it is possible to ensure a strength of the opening portion of the outer joint member 21. In addition, the mobile quenching is employed as a quenching method, and hence distortion is difficult to occur, and a thickness of the quenched and hardened layers can be uniformed.

As long as the magnetic field line cut-out bodies A include the ferromagnetic cores 56, it is possible to stably form the unquenched portions 50. Further, the ferromagnetic cores 56 may includes, for example, a silicon steel. In this case, without using a specific (special) material, it is possible to attach the ferromagnetic cores 56 to the high-frequency induction heating coil 51 at relatively low cost.

As described above, the outer joint member 21 in which the hardened layers S are formed is treated by the heat treatment method. Therefore, the outer joint member 21 is stable in terms of a strength thereof and is excellent in durability. Further, the outer joint member 21 molded in the above-mentioned manner can be used for assembling the tripod type constant velocity universal joint as illustrated in FIG. 4 to FIG. 6 or the like. Therefore, the tripod type constant velocity universal joint uses the outer joint member treated by the heat treatment method, and hence becomes a high-quality tripod type constant velocity universal joint excellent in the durability. In addition, a degree of freedom for designing, for example, downsizing of the joint increases.

Further, in the tripod type constant velocity universal joint as illustrated in FIG. 4 to FIG. 6 or the like, each of the torque transmission members (roller members) 23 is allowed to be tilted in the track groove 26. Thus, tilting of the roller is capable of absorbing tilting of the leg shaft when torque is transmitted under a state in which the joint forms an operating angle. Therefore, that contributes to a reduction of a sliding resistance, and therefore, a reduction of an induced thrust. Therefore, the constant velocity universal joint of the present invention can contributes, when applied in particular to a drive shaft in an automobile, optimization of noise, vibration, and harshness (NVH) performance of the automobile associated with the magnitude of the sliding resistance and the induced thrust. Further, a degree of freedom for a design of an under body of the automobile.

Figure 18:
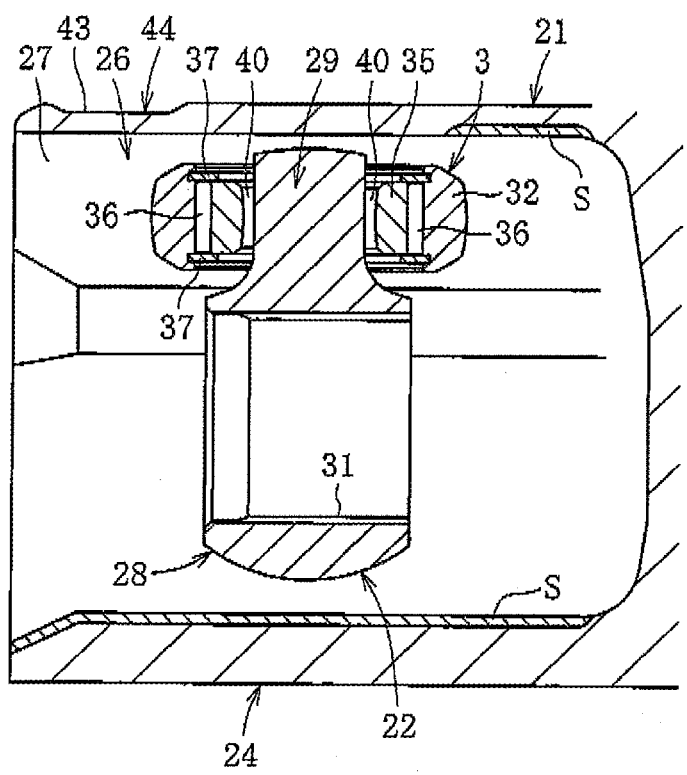
[FIG. 18] A cross-sectional view of a tripod type constant velocity universal joint of the present invention.

By the way, in the embodiment, the unquenched portion 50 is formed along the axial direction in the center portion in the circumferential direction of the larger radially-inner portion 46 as illustrated in FIG. 18. However, the unquenched portion 50 may be formed in the entire larger radially-inner portion 46, or the unquenched portion 50 may not be formed on a joint deep side of the larger radially-inner portion 46. That is, the hardened layer S may be formed on the joint deep side of the larger radially-inner portion 46 except for the opening portion (entrance portion) side corresponding to the boot mounting portion 44 and for a portion thereof situated at a regularly used position. That is because, even if the hardened layer is formed on the joint deep side of the larger radially-inner portion 46, an effect against the strength of the outer joint member is small. Further, regarding the smaller radially-inner portion 45, the hardened layer S may be formed or may not be formed. The hardened layer S may be formed only in the roller guide surface 27. Therefore, without deteriorating a function as the outer joint member 21, it is possible to form the hardened layer S in an optimum range.

Figure 7:
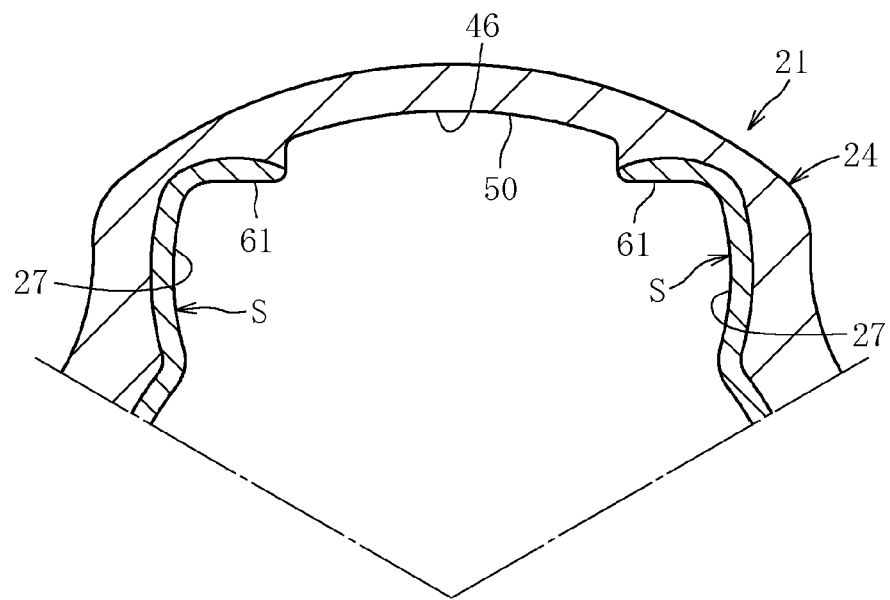
[FIG. 7] A main-part sectional view of an outer joint member according to anther embodiment.

Next, FIG. 7 illustrates an outer joint member 21 of another embodiment. In this case, on an outer diameter side of the roller guide surface 27 of the outer joint member 21, there are provided flange portions 61 opposed to the roller member 23. An inner surface of the larger radially-inner portion 46 is set to be the unquenched portion 50. Further, the hardened layers S are formed also with respect to the inner surfaces of the flange portions 61. The roller member 23 is brought into contact with the flange portions 61, and hence the hardened layers S are formed in the flange portions 61. Even in this case, the hardened layer S may be formed on the joint deep side of the larger radially-inner portion 46 except for the opening portion (entrance portion) side corresponding to the boot mounting portion 44 and for a portion thereof situated at a regularly used position.

Even in a case of the outer joint member 21 illustrated in FIG. 7, the high-frequency heating apparatus illustrated in FIG. 1 to FIG. 3 or the like can be used to form the hardened layers S. Therefore, the outer joint member 21 in which the above-mentioned hardened layers S are formed is treated by the heat treatment method, and hence the outer joint member is stable in terms of the strength thereof and is excellent in the durability. Further, the tripod type constant velocity universal joint using the outer joint member 21 molded in the above-mentioned manner becomes a high-quality tripod type constant velocity universal joint excellent in the durability.

Figure 8:
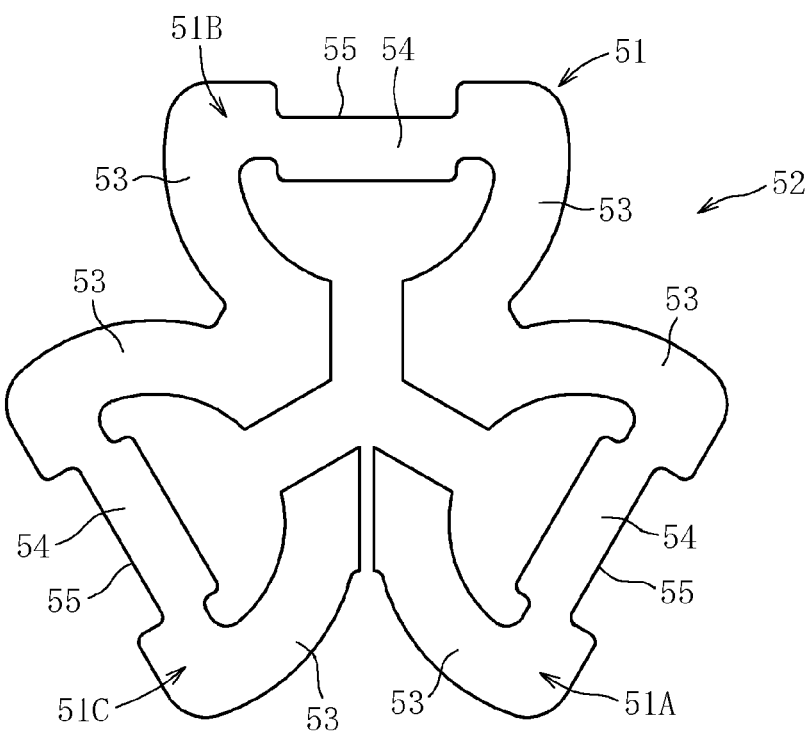
[FIG. 8] A plan view of another high-frequency induction heating coil.

By the way, in each of the heating portions 51A, 51B, 51C of the high-frequency induction heating coil 51 of the high-frequency heating apparatus, the recessed portions 55 respectively facing to the larger radially-inner portions 46 are formed. That is, the high-frequency induction heating coil 51 includes retracted positions to be prevented from coming close to the larger radially-inner portions 46. Therefore, without providing the magnetic field line cut-out bodies A including the ferromagnetic cores 56 or the like, it is possible to prevent the larger radially-inner portions 46 from being heated. Consequently, as the high-frequency induction heating coil 51, the high-frequency induction heating coil without the ferromagnetic cores 56 as illustrated in FIG. 8 may be used. Even in this case, it is possible to set the larger radially-inner portions 46 to be the unquenched portions 50.

Figure 9:
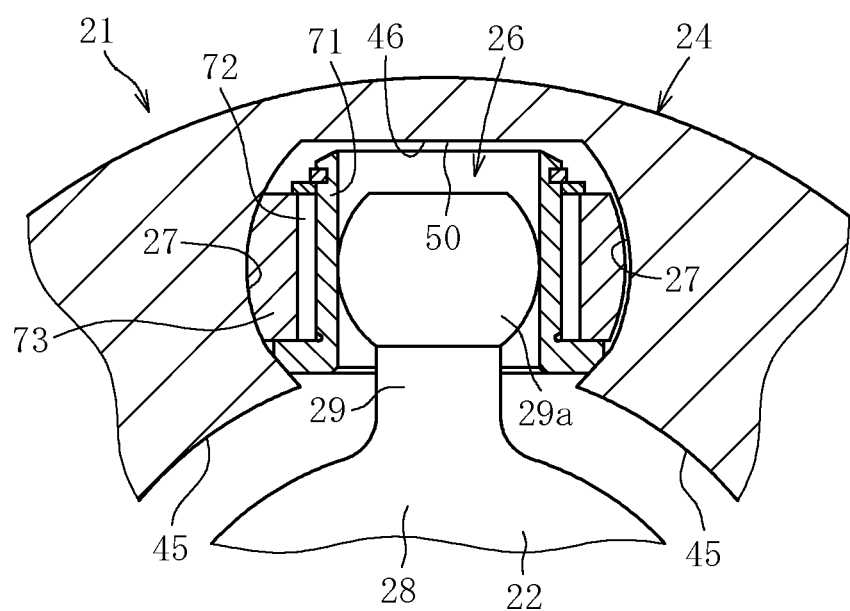
[FIG. 9] A main-part sectional view of another tripod type constant velocity universal joint of the present invention.
Figure 10:
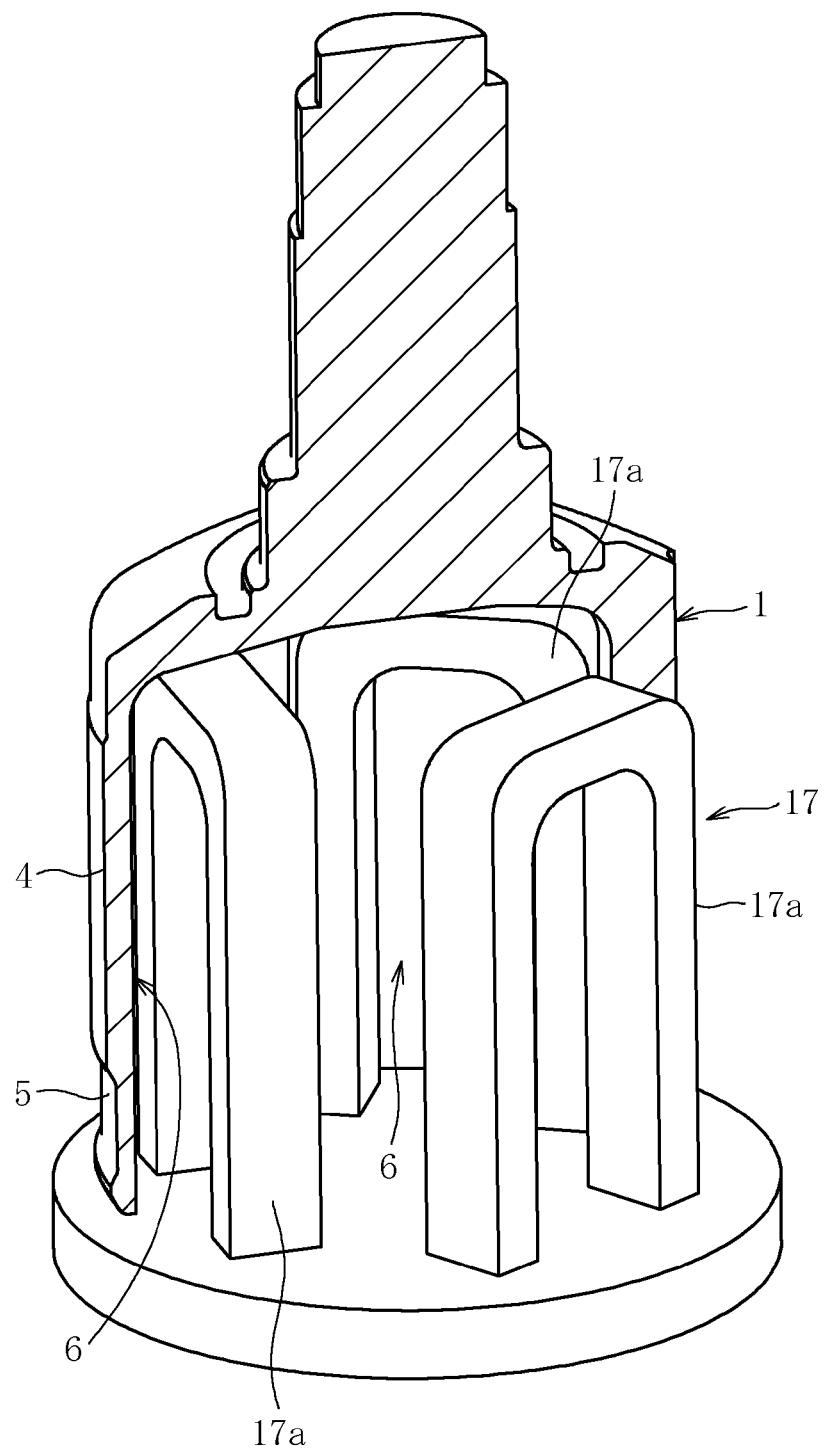
[FIG. 10] A perspective view of a conventional tripod type constant velocity universal joint in a heat treatment state by one-shot quenching.
Figure 11:
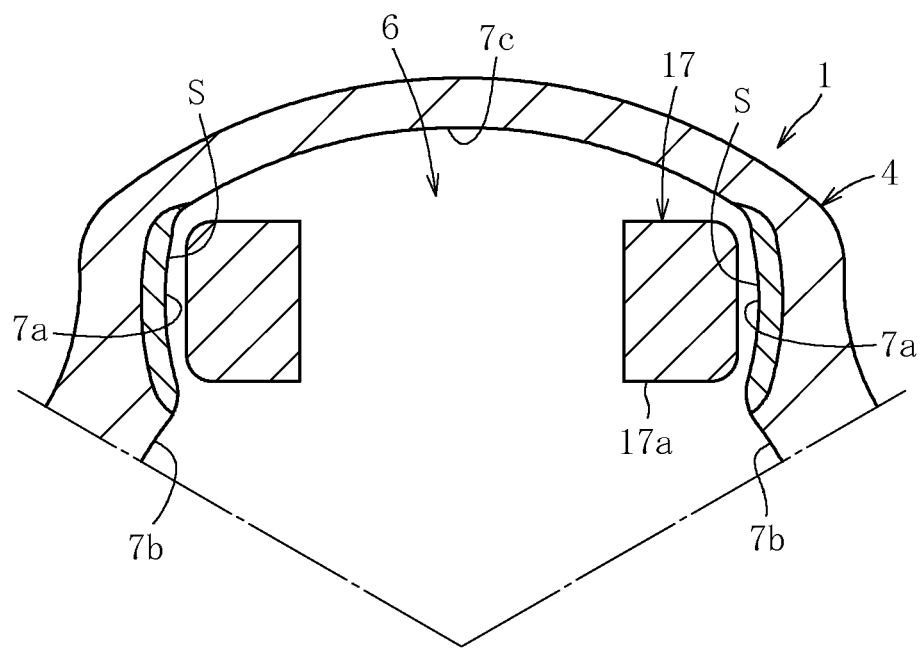
[FIG. 11] A main-part sectional view of the conventional tripod type constant velocity universal joint in the heat treatment state by the one-shot quenching.

Next, FIG. 9 illustrates another tripod type constant velocity universal joint. In this case, each of the roller members is fitted onto a spherical outer peripheral surface 29a of the leg shaft 29 to be capable of oscillating. The roller member is guided along the roller guide surfaces 27, 27 in the axial direction of the outer joint member 21. That is, the roller member includes: a rotation support 71 into which the spherical outer peripheral surface 29a of the leg shaft 29 is fitted; and an outer roller 73 on a side of an outer periphery of the rotation support 71 to be rotatable through the needle rollers 72.

It is possible to set the larger radially-inner portions 46 of the outer joint member 21 to be the unquenched portions 50 even in the following cases: a case of the outer joint member 21 of the above-mentioned tripod type constant velocity universal joint; a case of the high-frequency heating apparatus including the high-frequency induction heating coil 51 arranged in the magnetic field line cut-out bodies A (ferromagnetic cores 56) illustrated in FIG. 2 to FIG. 4 or the like; and a case of the high-frequency heating apparatus including the high-frequency induction heating coil 51 without the magnetic field line cut-out bodies A (ferromagnetic cores 56) as illustrated in FIG. 8.

Therefore, the tripod type constant velocity universal joint illustrated in FIG. 9 becomes a high-quality tripod type constant velocity universal joint excellent in the durability. In addition, a degree of freedom for designing, for example, downsizing of the joint increases.

Figure 16:
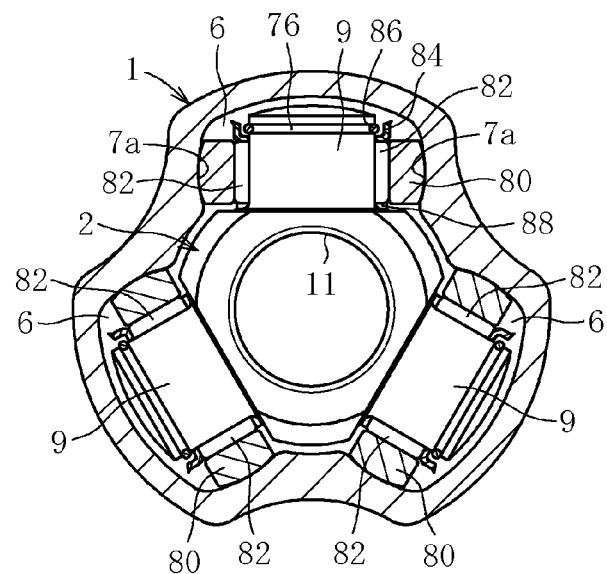
[FIG. 16] A cross-sectional view of a tripod type constant velocity universal joint of a single roller type.
Figure 17:
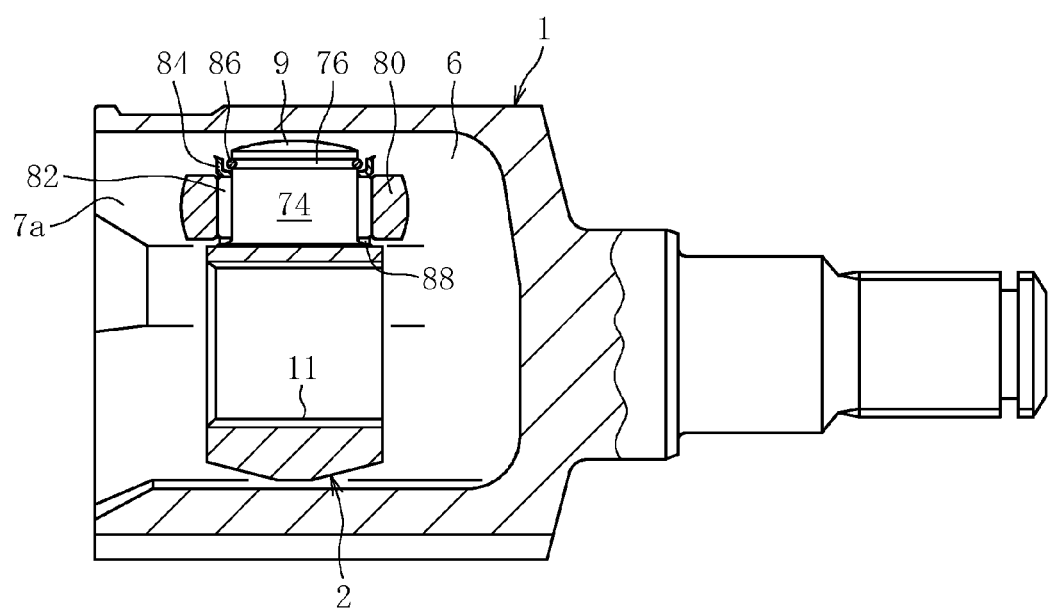
[FIG. 17] A longitudinal sectional view of the tripod type constant velocity universal joint illustrated in FIG. 16.

Although the embodiments of the present invention is described above, the present invention is not limited to the above-mentioned embodiments, and various modifications can be made. For example, the material of the ferromagnetic cores 56 may include, in addition to the silicon steel, a soft steel, and a ceramic such as a ferrite. Further, the tripod type constant velocity universal joint of FIG. 4 or the like uses a so-called double-roller type roller members each including the inner roller and the outer roller. However, as illustrated in FIG. 16 and FIG. 17, the tripod type constant velocity universal joint may use so-called single-roller type roller members each including the roller 80 fitted onto the cylindrical outer peripheral surface of the leg shaft 9 through the plurality of needle rollers 82 in such a manner that the roller 80 is rotatable.

Reference Signs List
21 outer joint member
22 tripod member
23 torque transmission member (roller member)
26 track groove
27 roller guide surface
28 boss
29 leg shaft
29a spherical outer peripheral surface
32 outer roller
35 ring
35 inner roller
40 gap
45 smaller radially-inner portion
46 larger radially-inner portion
50 unquenched portion
51 high-frequency induction heating coil
56 ferromagnetic core
61 flange
A magnetic field line cut-out body
S hardened layer

The invention claimed is:

1. A heat treatment method for forming hardened layers in roller guide surfaces of an outer joint member, the heat treatment method comprising:
 performing mobile quenching by moving a high-frequency induction heating coil in an axial direction relative to the outer joint member comprising track grooves that are formed at three positions of an inner periphery of the outer joint member, each of the track grooves comprising:
 the roller guide surfaces facing each other in a circumferential direction of the outer joint member; and
 a larger radially-inner portion provided between the roller guide surfaces;
 providing heating-suppressing portions for the larger radially-inner portions in the high-frequency induction heating coil by arranging magnetic field line cut-out bodies for cutting out magnetic field lines generated through the high-frequency induction heating coil at positions of the high-frequency induction heating coil that are opposed to the larger radially-inner portions; and
 setting a section of each of the larger radially-inner portions corresponding to a boot mounting portion at least a center portion in the circumferential direction of the outer joint member to be an unquenched portion.

2. A heat treatment method according to claim 1, wherein the high-frequency induction heating coil has recessed portions provided at the positions that are opposed to the larger radially-inner portions, and
 ferromagnetic cores constructing the magnetic field line cut-out bodies are located in the recessed portions.

3. A heat treatment method according to claim 2, wherein each of the ferromagnetic cores comprises a silicon steel.

4. A heat treatment method according to claim 1, further comprising:
 providing, on an outer diameter side of the roller guide surfaces of the outer joint member, flange portions to oppose a roller member, wherein the setting comprises setting at least the section of each of the larger radially-inner portions corresponding to the boot mounting portion to be an unquenched portion serving as an unheated portion.

5. A heat treatment method according to claim 4, further comprising forming hardened layers in surfaces of the flange portions, the surfaces to oppose the roller member.

6. A heat treatment method according to claim 1, further comprising:
    forming smaller radially-inner portions between the larger radially-inner portions of the outer joint member; and
    forming a hardened layer in the smaller radially-inner portions by the mobile quenching.

7. A heat treatment method according to claim 1, wherein the setting comprises setting an entirety of each of the larger radially-inner portions of the outer joint member to be an unquenched portion.

8. A heat treatment method according to claim 1, further comprising preventing the unquenched portions from being formed on a joint deep side of the larger radially-inner portions of the outer joint member.

9. A heat treatment method according to claim 1, further comprising forming hardened layers only in the roller guide surfaces on an inner diameter side of the outer joint member.

* * * * *